UNITED STATES PATENT OFFICE.

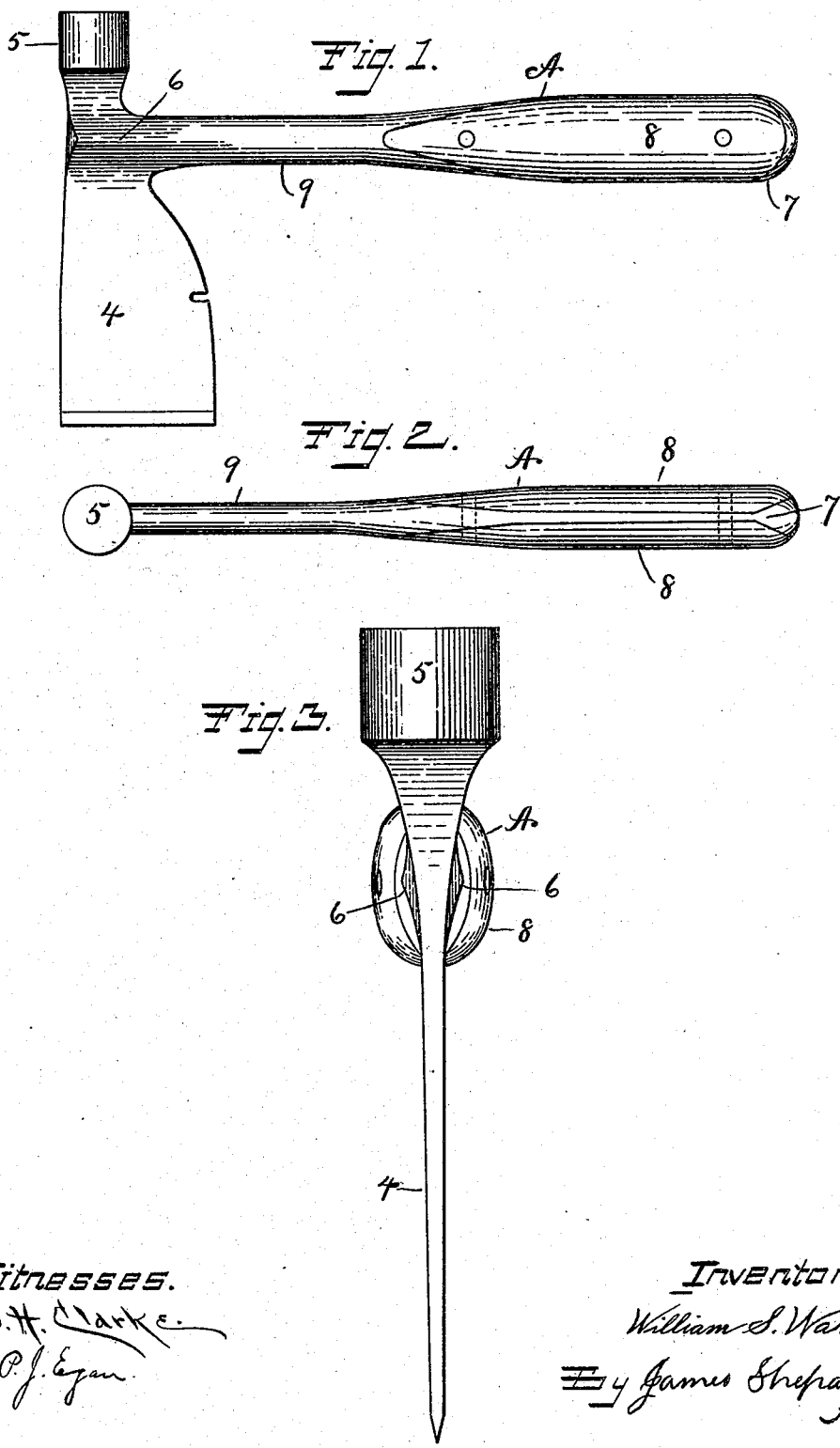

WILLIAM S. WARD, OF PLANTSVILLE, CONNECTICUT, ASSIGNOR TO H. D. SMITH AND COMPANY, OF PLANTSVILLE, CONNECTICUT, A CORPORATION OF CONNECTICUT.

HATCHET.

939,458.  Specification of Letters Patent.  Patented Nov. 9, 1909.

Application filed June 6, 1907. Serial No. 377,579.

*To all whom it may concern:*

Be it known that I, WILLIAM S. WARD, a citizen of the United States, residing at Plantsville, in the county of Hartford and State of Connecticut, have invented certain new and useful Improvements in Hatchets, of which the following is a specification.

My invention relates to improvements in hatchets and analogous tools and the objects of my improvement are simplicity and economy in construction and efficiency and convenience in use.

In the accompanying drawing:—Figure 1 is a side elevation of my hatchet. Fig. 2 is a plan view of the same, and:—Fig. 3 is an enlarged end view of the same as viewed from the head end.

The hatchet head is composed of a blade 4, hammer head 5 and handle junction 6 all formed in one and the same piece of metal and rigid with the metal part of the handle portion A. The said handle portion consists of a flattened handle frame 7, shank 9, handle scales applied to the broad sides of the handle frame and the handle shank 9. These metal parts may all be forged in one piece of drop forged steel or of separate pieces of steel and iron welded together, and drop forged into the desired form. The handle junction 6 of the hatchet head takes the place of the usual eye for a wooden handle and extends transversely across the blade in the form of ribs which project slightly from the blade in continuation of the handle portion as shown in Figs. 1 and 3. The hammer head 5 is formed at the upper end of the blade which extends upwardly from the sloping upper side of the said handle junction. The two sides of the hatchet at the handle junction 6 project slightly more than the sides of the hatchet blade, but merge into the adjacent portion of the shank 9 so as to form a continuation of the same and of substantially the same lateral projection, that is to say, without any substantial increase in thickness. This feature is believed to be an advantage in the use of the tool over and above the fact that there is no possible danger of the hatchet head ever becoming loose or detached from the handle portion.

Small axes or other headed and bladed tools with cutting edges, such as are usually provided with a handle eye integral with the blade are considered as analogous tools to the hatchet herein shown and described.

I claim as my invention:—

A hatchet comprising a head and a handle portion; the said head consisting of a blade 4, hammer head 5 and a handle junction 6 intermediate the said blade and head, the two sides at the said junction projecting slightly more than the parts immediately above and below the said junction; the said handle portion consisting of a shank 9, formed in continuation of the said handle junction, and a flattened handle frame 7; the said blade 4, hammer head 5, handle junction 6, shank 9, and handle frame 7 being all formed of drop forged metal in a single forging, substantially as described.

WILLIAM S. WARD.

Witnesses:
JAMES SHEPARD,
SHEFFIELD H. CLARKE.